United States Patent
Acharya et al.

(10) Patent No.: US 6,229,578 B1
(45) Date of Patent: May 8, 2001

(54) EDGE-DETECTION BASED NOISE REMOVAL ALGORITHM

(75) Inventors: Tinku Acharya, Tempe; Ping-Sing Tsai, Chandler, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/986,761

(22) Filed: Dec. 8, 1997

(51) Int. Cl.$^7$ ................................ H04N 9/64; G06K 9/00
(52) U.S. Cl. .................... 348/607; 348/625; 382/162
(58) Field of Search ....................... 348/625–631, 348/606, 607; 382/162, 176, 167, 22

(56) References Cited

U.S. PATENT DOCUMENTS

| | | | | |
|---|---|---|---|---|
| 4,561,022 | * | 12/1985 | Bayer | 358/167 |
| 4,573,070 | * | 2/1986 | Cooper | 358/36 |
| 5,023,919 | * | 6/1991 | Wataya | 382/54 |
| 5,231,677 | * | 7/1993 | Mita et al. | 382/22 |
| 5,392,137 | * | 2/1995 | Okubo | 358/462 |
| 5,475,769 | * | 12/1995 | Wober et al. | 382/167 |
| 5,574,800 | * | 11/1996 | Inoue et al. | 382/205 |
| 5,606,631 | * | 2/1997 | Weiss et al. | 382/275 |
| 5,629,734 | * | 5/1997 | Hamilton et al. | 348/222 |
| 5,689,582 | * | 11/1997 | Murakami et al. | 382/176 |
| 5,694,487 | * | 12/1997 | Lee | 382/201 |
| 5,793,885 | * | 8/1998 | Kasson | 382/167 |
| 5,841,899 | * | 11/1998 | Ide et al. | 382/168 |
| 5,855,433 | * | 1/1999 | Velho et al. | 382/162 |
| 5,901,242 | * | 8/1998 | Crane et al. | 382/166 |

OTHER PUBLICATIONS

"A New Class of Detail–Preserving Filters for Image Processing," by Air Nieminen, Pekka, Heinonen and Yrjo Neuvo, IEEE Transactions on Pattern Analysis and Machine Intelligence, vol. PAMI–9, No., Jan. 1987, pp. 74–90.

"The Canny Edge Detector," Advanced Edge–Detection Techniques, pp. 23–29.

* cited by examiner

*Primary Examiner*—Andrew I. Faile
*Assistant Examiner*—Reuben M. Brown
(74) *Attorney, Agent, or Firm*—Blakely, Sokoloff, Taylor & Zafman LLP

(57) ABSTRACT

What is disclosed is a method for removing noise by distinguishing between edge and non-edge pixels and applying a first noise removal technique to pixels classified as non-edge pixels and a second noise removal technique to pixels classified as edge pixels. The methodology operates on images while in a Color Filter Array (CFA) domain prior to color interpolation, and uses techniques suited to the classification, whether edge or non-edge.

22 Claims, 7 Drawing Sheets

|   | 1 | 2 | 3 | 4 | 5 | 6 |
|---|---|---|---|---|---|---|
| 1 | $G_1$ | [B] | $G_1$ | [B] | $G_1$ | [B] |
| 2 | R | $G_2$ | R | $G_2$ | R | $G_2$ |
| 3 | $G_1$ | [B] | $G_1$ | [B] | $G_1$ | [B] |
| 4 | R | $G_2$ | R | $G_2$ | R | $G_2$ |
| 5 | $G_1$ | [B] | $G_1$ | [B] | $G_1$ | [B] |
| 6 | R | $G_2$ | R | $G_2$ | R | $G_2$ |

⟹ BLUE SUB-IMAGE

|   | 1 | 2 | 3 | 4 | 5 | 6 |
|---|---|---|---|---|---|---|
| 1 | [$G_1$] | B | [$G_1$] | B | [$G_1$] | B |
| 2 | R | $G_2$ | R | $G_2$ | R | $G_2$ |
| 3 | [$G_1$] | B | [$G_1$] | B | [$G_1$] | B |
| 4 | R | $G_2$ | R | $G_2$ | R | $G_2$ |
| 5 | [$G_1$] | B | [$G_1$] | B | [$G_1$] | B |
| 6 | R | $G_2$ | R | $G_2$ | R | $G_2$ |

⇓ $G_1$ SUB-IMAGE

|   | 1 | 2 | 3 | 4 | 5 | 6 |
|---|---|---|---|---|---|---|
| 1 | $G_1$ | B | $G_1$ | B | $G_1$ | B |
| 2 | R | [$G_2$] | R | [$G_2$] | R | [$G_2$] |
| 3 | $G_1$ | B | $G_1$ | B | $G_1$ | B |
| 4 | R | [$G_2$] | R | [$G_2$] | R | [$G_2$] |
| 5 | $G_1$ | B | $G_1$ | B | $G_1$ | B |
| 6 | R | [$G_2$] | R | [$G_2$] | R | [$G_2$] |

⇓ $G_2$ SUB-IMAGE

|   | 1 | 2 | 3 | 4 | 5 | 6 |
|---|---|---|---|---|---|---|
| 1 | $G_1$ | B | $G_1$ | B | $G_1$ | B |
| 2 | [R] | $G_2$ | [R] | $G_2$ | [R] | $G_2$ |
| 3 | $G_1$ | B | $G_1$ | B | $G_1$ | B |
| 4 | [R] | $G_2$ | [R] | $G_2$ | [R] | $G_2$ |
| 5 | $G_1$ | B | $G_1$ | B | $G_1$ | B |
| 6 | [R] | $G_2$ | [R] | $G_2$ | [R] | $G_2$ |

⟹ RED SUB-IMAGE

Fig. 3

|   | 1  | 2  | 3  | 4  | 5  | 6  |
|---|----|----|----|----|----|----|
| 1 | NE | NE | $E_1$ | NE | $E_4$ | NE |
| 2 | NE | $E_1$ | NE | NE | $E_4$ | NE |
| 3 | NE | $E_1$ | NE | NE | $E_4$ | NE |
| 4 | NE | $E_1$ | $E_1$ | NE | NE | $E_3$ |
| 5 | NE | NE | $E_1$ | NE | NE | $E_3$ |
| 6 | $E_2$ | $E_2$ | $E_1$ | NE | $E_3$ | $E_3$ |

E - EDGE PIXELS
- $E_1$ - FIRST EDGE FEATURE,
- $E_2$ - SECOND EDGE FEATURE,
- $E_3$ - THIRD EDGE FEATURE,
- $E_4$ - FOURTH EDGE FEATURE

NE - NON-EDGE PIXELS

EDGE-DETECTION BASED NOISE REMOVAL ALGORITHM

BACKGROUND OF THE INVENTION

1. Field of the Invention

The invention relates generally to the field of image processing. More specifically, the invention relates processing of images generated by a digital imaging device.

2. Description of the Related Art

In the art of image processing, raw images of an object/scene captured from a sensing or capture device are often subject to varying types of "noise" (elements not present in the object or environment which may nonetheless appear in the image). The noise present in an image may be due to the characteristics of the imaging system such as the sensor or processing steps subsequent to the initial image capture which may add noise while trying to achieve a different purpose. The properties and characteristics that would indicate that a pixel or region of pixels is "noisy" and the properties that would indicate a pixel or region of pixels is an edge or a fine detail of the image are difficult to distinguish. Thus, a fundamental problem with the removal of noise is that often a removal of what is indicated as noise may actually be a removal of fine edge or detail. If the fine detail or edge is removed, a blurring effect may occur within that region of the image further, in color images, the blurring effect leads to a bleeding of one color across the edge to another pixel(s). Noise removal procedures that were based upon linear filtering techniques suffered greatly from this malady and thus, a class of filtering techniques based on ranked order statistics such as the median were developed.

The median filter ranks in order the intensity values belonging to a pixel P (for which the filter is being applied) and pixels in a particular neighborhood or along a particular vector about a pixel P. For example, a median filter (applied in a particular direction(s) through the pixel to neighboring pixels) applied to sample values including and about the pixel P of {12, 13, 200, 50, 14} would first be ranked in order as {12, 13, 14, 118, 200}. The so-called uni-directional FIR median hybrid filter would replace the original pixel location P that had a value of 200 with the median of the sample set which is 14. Thus, the output vector, after the filter, would be: {12, 13, 14, 50, 14}. If the value 200 were in fact part of an edge rather than noise, the smoothing caused by applying the filter as shown in the output vector values would decimate the edge feature.

Several improved median filters have been developed to compensate for this problem. One particular such median filter, the multilevel FIR (Finite Impulse Response) median hybrid filter repeatedly takes the median filter in each direction about an image and applies at each filter the original input pixel. The multi-level median hybrid filter has averaging sub-filters that reduce the burden of sorting operations by averaging pixels in a particular filter direction, and then performing the median computation upon a smaller set of values, such as three. Thus, in a median hybrid filter, two neighboring west pixels would be averaged and the result fed to a median filter along with the average of two neighboring east pixels. The third input to the median filter is the pixel under consideration for noise removal. In other directions, a similar procedure is applied. In a three-level median hybrid filter, the first level pairs all such averaged neighboring pixels with vectors in opposing directions (north with south, etc.) and for each pair of direction averages (8 of them) feeds these into a median filter also along with the pixel of concern as a third input. The resulting median values of the first filter are again paired and along with the pixel of concern are input to a median filter. While median hybrid has been shown to work quite well in discriminating some edges, it is deficient in several respects with regard to edge detection. The median hybrid filter does not consider the noisiness of the edge itself In other words, an edge's direction, even though eight are employed, cannot be determined with exacting accuracy. For instance, an edge feature may lie at a 33 degree vector from a particular pixel, and thus the eight directions are inadequate in determining the edge feature. In other words, a single pixel may contain a portion that is edge and a portion that is non-edge in the non-discrete world that cannot be represented in the discrete world of digital images. When applied to digital images, the median hybrid filter, if applied everywhere to all pixels, may propagate noise or shift it from pixel to pixel while attempting to remove it since there is noise along the edge feature due to the non-cardinal direction of the edge. A curved edge is a perfect example of such a problem.

When an object/scene is imaged by a sensing or imaging device such as a digital camera, the resultant image in captured into a CFA (Color Filter Array) bearing a particular color channel pattern. One oft-used pattern for capturing images is known as the Bayer pattern, which has color channels as follows,

G R G R G R . . .
B G B G B G . . .
G R G R G R . . .

with rows thereafter repeating the pattern.

Thus, in a Bayer pattern CFA, each pixel location has an intensity value associated only with one of the three color planes (Red, Green and Blue) which combine to make a full color. The process of estimating the two missing color components for each pixel location is known in the art as color interpolation. The interpolation of color often precedes the removal of noise in color images due to the fact that most traditional noise reduction or removal techniques are designed to operate upon images with full color pixel information. The process of color interpolation itself will introduce noise, and in the case of a digital camera, where the color interpolation is most likely performed after image compression and download to a data processing system such as a computer, the intermediary steps of color resolution companding, compression (quantization and encoding) and decompression may add additional noise such that the original captured image noise may be blended with other noise to perhaps lose the distinction of being noise and gain the distinction of being an image feature. Performing noise removal on the full color pixels attained by the color interpolation process increases the memory and processing needs of the noise removal process by a factor of 3 (since each pixel has thrice the resolution), and thus is difficult and expensive to implement in hardware. Other noise removal techniques attempt to reduce this burden by performing color space conversion after color interpolation into, for instance, the YUV space, where only the Y (chrominance) component is considered for noise removal. However, this too may propagate additional noise beyond that propagated by color interpolation and also cannot be easily be implemented in hardware.

Thus, there is a need for a noise reduction framework that will not only distinguish edge pixels from non-edge pixels, but also one that can work directly in the CFA image domain prior to any color interpolation.

SUMMARY OF THE INVENTION

A method is disclosed having the steps of classifying pixels of a captured image while in its Color Filter Array form as either edge pixels or non-edge pixels. The method next performs noise removal by applying a first noise removal technique to those pixels classified as non-edge pixels and applying a second noise removal technique to those classified as edge pixels. Both noise removal techniques are applied while the image is still in the Color Filter Array form.

BRIEF DESCRIPTION OF THE DRAWINGS

The objects, features and advantages of the method and apparatus for the present invention will be apparent from the following description in which.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

When an image captured by a sensor or camera or other imaging device is analyzed, it can be said to have portions of the image which are "noise" or "noisy" while other portions are not. The determination of what constitutes noise is difficult and not an exaction process. Noise may be confused with a detail such as thin line or "edge" portion of the image. The removal of noise in a captured image is optimal when detail information is still preserved while noise is removed. In traditional noise removal, each pixel, whether having edge features or not, is treated by the same noise removal technique due in large part to this relative inability to distinguish noise from edges.

In color images, such as those captured into a Bayer pattern CFA (Color Filter Array), the step of color interpolation may additionally introduce noise and thus, the original noise due to the imaging device itself is further perturbed. The addition of various types of noise, at each stage of the imaging process from capture to rendering presents additional difficulty since the noise patterns are combined in an unknown way. The resulting image will have elements that cannot be distinguished as noise, and thus, when the Bayer pattern CFA is subjected to color interpolation, as is required a priori for most noise removal techniques, the colors will bleed from edge to edge and feature to feature. For instance, consider a blue edge feature lying on a yellow background. Due to noise a red pixel may lie somewhere on the edge boundary. Due to typical color interpolation methods, the blue and yellow will be averaged together with the red to form a full pixel with blue, yellow and red somewhere in the neighborhood (since red appears to exist as a feature, albeit small, within the image region), and thus, a false color pixel will be generated which may not thereafter be discernible as noise to a noise removal process.

Thus, it would be desirable to devise a noise removal technique that works in the CFA domain prior to the process of color interpolation so that the additive noise and color bleeding problem can be circumvented. Further, the technique should treat and consider pixels belonging to edge features in the image differently from pixels not belonging to edge features. Also, the technique(s) used should be capable of fast hardware implementation such that it can be implemented, if desired, in a digital camera where the CFA is generated. One such possible noise removal methodology is shown in FIG. 1 and in various other embodiments discussed below.

Figure 1:
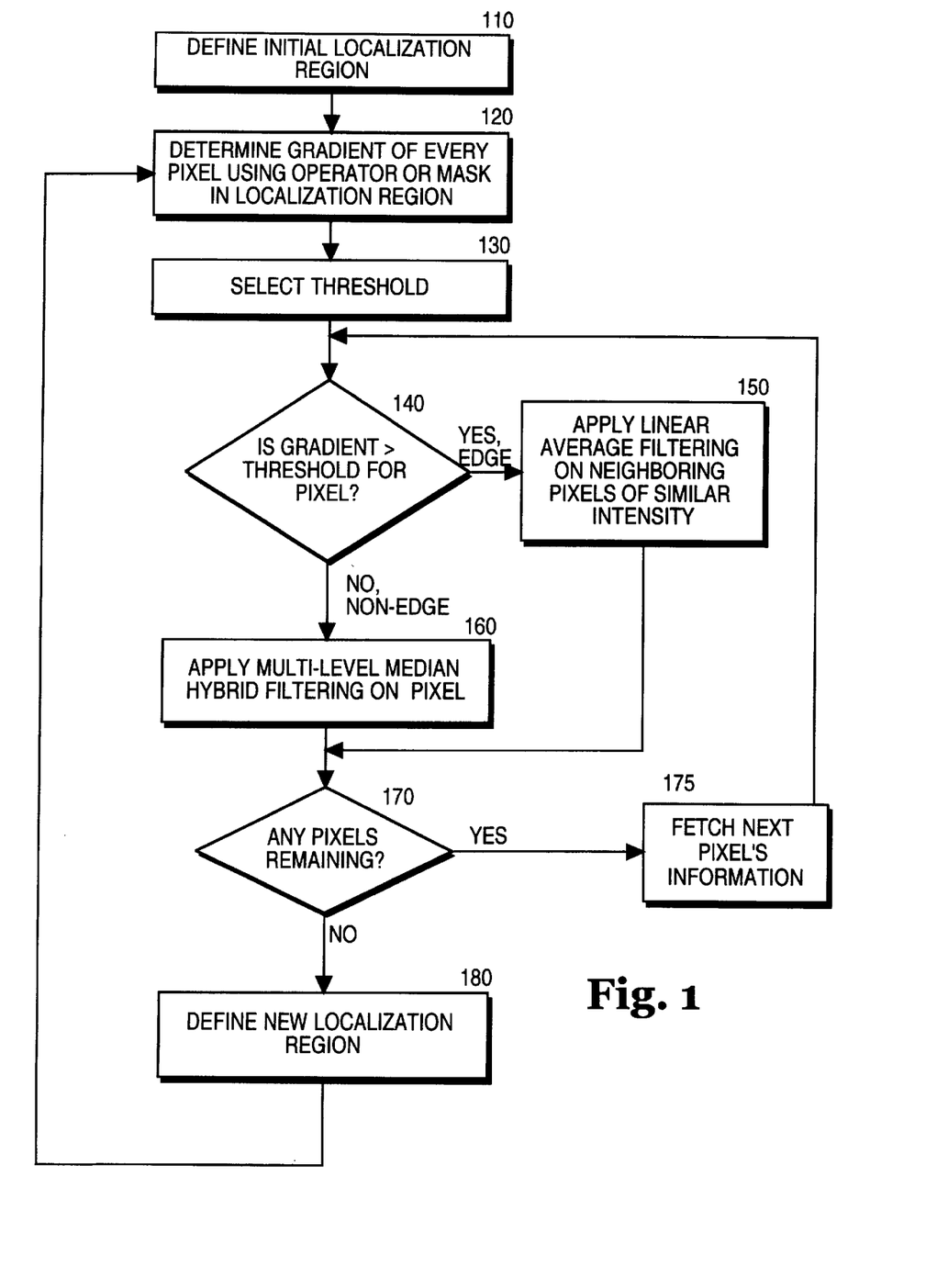
FIG. 1 is a flow diagram on one embodiment of the invention.

FIG. 1 is a flow diagram on one embodiment of the invention.

First, an initial localization region within the captured image is defined (step 110). The initial localization region will be a M by N rectangular region of the captured image where M and N may be equal if desired thereby defining a square region. The localization region as a percentage of the total captured image size may be large or small depending upon the desired implementation and available hardware/software resources and speed constraints for how fast the image is desire to be processed for the removal of noise. Where the image is more uniform in characteristics over a larger region, the localization region may be defined large. However, if fine detail discrimination is crucial or the image shows wide variations in characteristics within small regions, the localization region can be defined smaller.

Figure 2A:
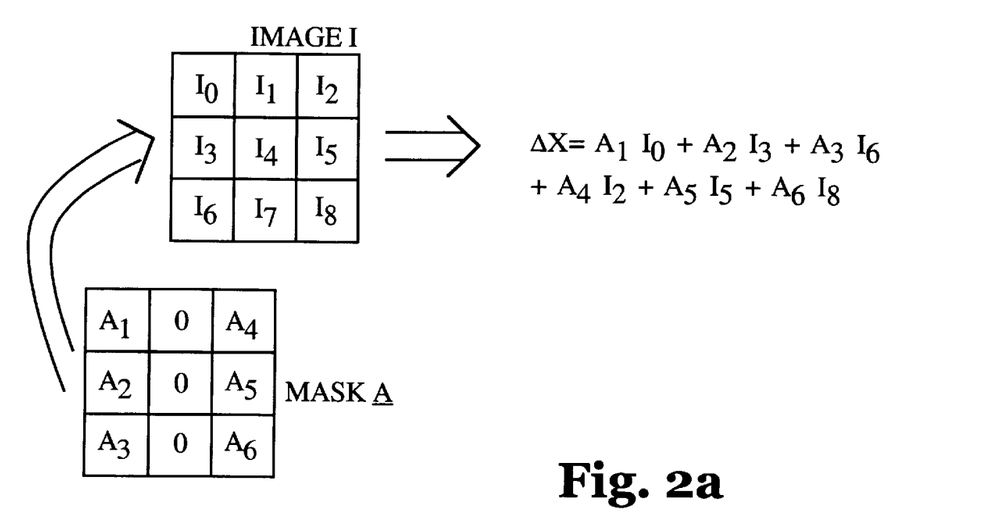
FIG. 2(a) illustrates a mask for obtaining a first direction differential.
Figure 2B:
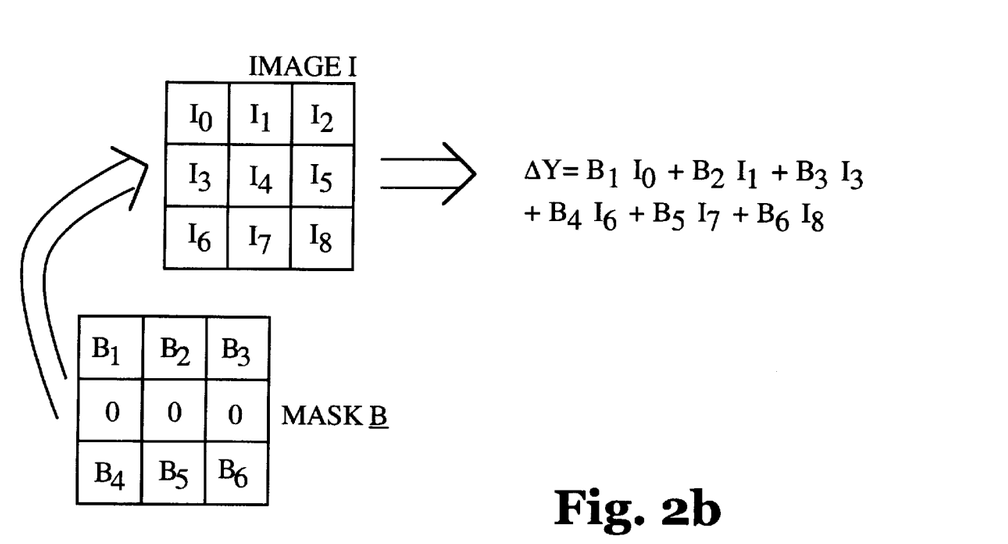
FIG. 2(b) illustrates a mask for obtaining a first direction differential.

Once the localization region is defined, the next step is to determine the gradient value associated with each and every pixel in the localization region by applying some mask or operator (step 120). This mask or gradient operator is applied to a small neighborhood about each pixel, ordinarily with that neighborhood as well being of smaller size than the localization region. FIGS. 2(a)–2(b) and associated description illustrate the parameters and configuration of such a mask with a 3 by 3 neighborhood about and including the pixel whose gradient is being determined. By repeatedly applying the operator or mask to each pixel in the localization region and determining the gradient thereby, gradient information for the localization region can be completed. In most gradient-based edge detection, the gradient value is normalized over the entire image by dividing the gradient by the maximum gradient in the entire image. However, such a normalization would require, if implemented in hardware, a two-pass approach where gradient information for all pixels in the entire captured image must be determined and then, each gradient divided by the maximum gradient value found within the image. In the various embodiments of the invention, the gradient may instead be normalized by the maximum within the localization region.

Once the gradient information is determined, a threshold should be selected (step 130). The threshold value may be selected as a single value applicable throughout the image or as varying from localization region to localization region. Further, the threshold may be preset to a particular value for every image captured by the imaging device. Such a preset threshold is not very accurate and can upset the edge detection process, but according to the current state of the art, is most desirable for a hardware implementation of noise removal. The selection of this threshold is not a subject of this invention, but if the gradient information of every pixel within the localization region is first determined it may be possible to dynamically select a threshold value.

Whatever the selected threshold value, the gradient (or normalized gradient) is compared against that threshold value (step 140). If the gradient (or normalized gradient) exceeds the threshold value, the corresponding pixel can be classified as an "edge" pixel which is a pixel that belongs to a edge feature of the image such as a line. If not, the pixel is classified as a non-edge pixel. According to one embodiment of the invention, the edge pixel and non-edge pixel each receives a different noise removal treatment. While one method of edge detection, namely gradient based edge detection has been presented in the flow diagram of FIG. 1, any suitable edge detector may be utilized. For instance, the well-known Canny edge detector, which uses Gaussian masks convolved with the image space in classifying edge and non-edge pixels, may be used in conjunction with the technique of FIG. 1, and if capable of implementation in the desired application, will provide good edge discrimination. For a digital imaging device such a portable still digital camera, an edge detector such as the one presented in FIGS. 1, 2(*a*) and 2(*b*) are more optimal due to the speed of their computation and use of less silicon area within the device.

By classifying pixels as either edge pixels or non-edge pixels, they may, according to one embodiment of the invention, be then subjected to different noise removal technique and treatment. Thus, according to step 160, a noise removal technique such as multi-level median hybrid filtering may be applied upon the pixel (see FIG. 5 and associated description) if the pixel is a non-edge pixel. This treatment avoids the problem posed by median filtering of blurring and decimating edge features, since the pixel does not belong to an edge feature. The median filtering, when applied to the non-edge pixel will have the desired effect of removing noise without blurring the edge.

Since noise may also be present in a pixel that is classified as an edge pixel, the edge pixel is subjected to a smoothing technique such as linearly averaging neighboring pixels having a similar intensity value (step 150). This smoothing ensures that an edge is not completely decimated and in fact, may enhance the edge in appearance (i.e., sharpen the edge by smoothing together the color (intensity) more uniformly). The linear averaging technique replaces the pixel under consideration with a linear average of itself and neighboring pixels that have a similar intensity. One method of discovering which pixels qualify to be of "similar intensity" is described below with respect to FIG. 6 and its associated description. Essentially, the goal is that two or more edge features that border each other should not be confused when averaging so that edge features are not combined together improperly.

Next, if any pixels are remaining to be treated to noise removal within the localization region (checked at step 170), the next pixel's information is fetched (step 175) and steps 140–160 are repeated. Once all pixels within the localization region are treated to noise removal, a new localization region may be defined (step 180). Processing then continues with steps 120–170 repeating for the localization threshold. Preferably and for a fast implementation, the localization regions should be exclusive, but may overlap if desired. The noise removal technique described in FIG. 1 may be applied directly in the CFA domain to pixels in Bayer pattern prior to any color interpolation. Thus, the FIG. 1 technique, if so employed, will reduce the amount of propagated noise throughout the various stages of processing the image.

FIG. 2(*a*) illustrates a mask for obtaining a first direction differential.

One means of determining the gradient for a pixel is to apply a mask $\underline{A}$ which essentially finds the "strength" of the pixel about a neighborhood boundary that the mask covers. This strength is essentially a differential in a particular direction along two boundaries of a pixel. This first direction, when combined with a similar computation for the strength along a second direction boundary gives a good estimation of the relative strength of the center pixel as against its neighbors. In FIG. 2(*a*), 3 by 3 mask is illustrated that has non-zero coefficients in its $1^{st}$ and $3^{rd}$ columns, and zero coefficients in the middle or $2^{nd}$ column. The mask $\underline{A}$ is shown to have six non-zero coefficients A1, A2, A3, A4, A5 and A6. When the mask is applied to an Image region I having pixels with intensity values I0, I1, I2, I3, I4, I5, I6, I7 and I8, the resultant differential $\Delta x$ is expressed as: $\Delta x = A1*I0 + A2*I3 + A3*I6 + A4*I2 + A5*I5 + A6*I8$. The differential $\Delta x$ can be used in calculating the gradient of the pixel with intensity value I4, shown to be in the center of the image region I. Ordinarily, the mask $\underline{A}$ will have coefficients that summed together give zero. In the well-known Sobel mask, the coefficients A1, A2 and A3 all have values of −1 while the coefficients A4, A5 and A6 all have values of +1. Thus with a Sobel mask's coefficients, $\Delta x$, the differential, is $\Delta x = I2 + I5 + I8 - I0 - I3 - I6$. Thus, the choice of mask coefficients, which is known in the art to achieve a meaningful gradient value, simplifies the differential computation to a mere addition and subtraction of pixel intensity values which can be implemented easily in hardware by adders. Thus, the differential becomes easy to implement and fast. A different mask, such as the Prewitt mask, if applied can be as easily implemented. The Prewitt mask has coefficients of A1 and A3 equal to −1 and an A2 coefficient of −2. To mirror, the Prewitt mask has coefficients on the other directional boundary of A4 and A6 equal to +1 and a coefficient A5 of +2. Using a Prewitt mask, the $\Delta x$ or differential value becomes $\Delta x = I2 + 2*I5 + I8 - I0 - 2*I3 - I6$. Though a multiplication by 2 is introduced, this can be implemented easily by a shift operation of I5 and I3 or by splitting the computation $\Delta x$ as $\Delta x = I2 + I5 + I5 + I8 - I0 - I3 - I3 - I6$ if only add and subtract operations are implemented in the hardware.

The gradient operation is used in edge detection since it is assumed that an edge has a particular direction within the image space. The pixels along the side boundary (one side—I0, I3, I6 and another side—I2, I5, I8) of the pixel should have a strength or relative combined intensity level less than the pixel I4 itself if I4 is to be considered an edge pixel. In this regard, a first direction differential, essentially in the horizontal direction (the mask has values determining the strength on the left and right sides of the image) may be computed as given above. Since the image space is in two dimensions, vertical and horizontal, only one more direction differential about the pixel I4 need be computed.

FIG. 2(*b*) illustrates a mask for obtaining a second direction differential according to one embodiment of the invention.

In FIG. 2(*b*), a second 3 by 3 mask is illustrated that has non-zero coefficients in its $1^{st}$ and $3^{rd}$ rows, and zero coefficients in the middle or $2^{nd}$ row. The mask $\underline{B}$ is shown to have six non-zero coefficients B1, B2, B33, B4, B5 and B6. When the mask is applied to an Image region I having pixels with intensity values I0, I1, I2, I3, I4, I5, I6, I7 and I8, the resultant differential $\Delta y$ is expressed as: $\Delta y$=B1*I0+ B2*I1+B3*I2+B4*I6+B5*I7+B6*I8. The differential $\Delta y$ can be used in calculating the gradient of the pixel with intensity value I4, shown to be in the center of the image region I. Ordinarily, the mask $\underline{B}$ will have coefficients that summed together give zero. In the well-known Sobel mask, the coefficients B1, B2 and B3 all have values of −1 while the coefficients B4, B5 and B6 all have values of +1. Thus with a Sobel mask's coefficients, $\Delta y$, the differential, is $\Delta y$=I6+I7+I8−I0−I1−I2. Thus, the choice of mask coefficients, which is known in the art to achieve a meaningful gradient value, simplifies the differential computation to a mere addition and subtraction of pixel intensity values which can be implemented easily in hardware by adders. Thus, the differential becomes easy to implement and fast. A different mask, such as the Prewitt mask, if applied can be as easily implemented. The Prewitt mask has coefficients of B1 and B3 equal to −1 and an B2 coefficient of −2. To mirror, the Prewitt mask has coefficients on the other directional boundary of B4 and B6 equal to +1 and a coefficient B5 of +2. Using a Prewitt mask, the $\Delta y$ or differential value in the second direction along the image boundary becomes $\Delta y$=I6+ 2*I7+I8−I0−2*I1−I2. Though a multiplication by 2 is introduced, this can be implemented easily by a shift operation of I5 and I3 or by splitting the computation $\Delta x$ as $\Delta y$=I6+I7+I7+I8−I0−I1−I1−I2 if only add and subtract operations are implemented in the hardware. Preferably, the mask $\underline{A}$ used to find the $\Delta x$ or first direction differential should be the same type of mask $\underline{B}$ that is used to find the second direction differential. It may be desirable to use a Sobel mask in one direction and Prewitt in another to compensate since the imaging device may not yield square pixels, but rather, rectangular pixels or pixels of other shape. In such a case, the geometry of a pixel may be accounted for in the choice of mask coefficients.

With the second direction differential $\Delta y$ obtained as given above, both directional boundary pairs horizontal and vertical are accounted for. Then the gradient of I4, the central pixel in the image space I is the magnitude of the vector obtained by a vector which is the sum of the vectors obtained in each direction. Hence, the gradient G is simply $\sqrt{\Delta x^2 + \Delta y^2}$, or the magnitude of that vector formed by combining $\Delta x$ and $\Delta y$. The gradient of each pixel may thus be obtained by considering a neighborhood, preferably a small 3 by 3 neighborhood that surrounds each pixel, and then by applying a mask upon it in each of two directions and their corresponding boundary pairs essentially thereby including every immediately adjacent pixel in the gradient determination. As mentioned above, the gradient value may be normalized for the maximum gradient present in the image so that relative weight is given to the gradient measure. For instance, in a captured image of a scene with more texture rather than hard edges such as lines, the gradient values may lie within a narrow region. If these are normalized, to the maximum gradient, then the gradient values obtained can be more effectively analyzed.

Figure 3:
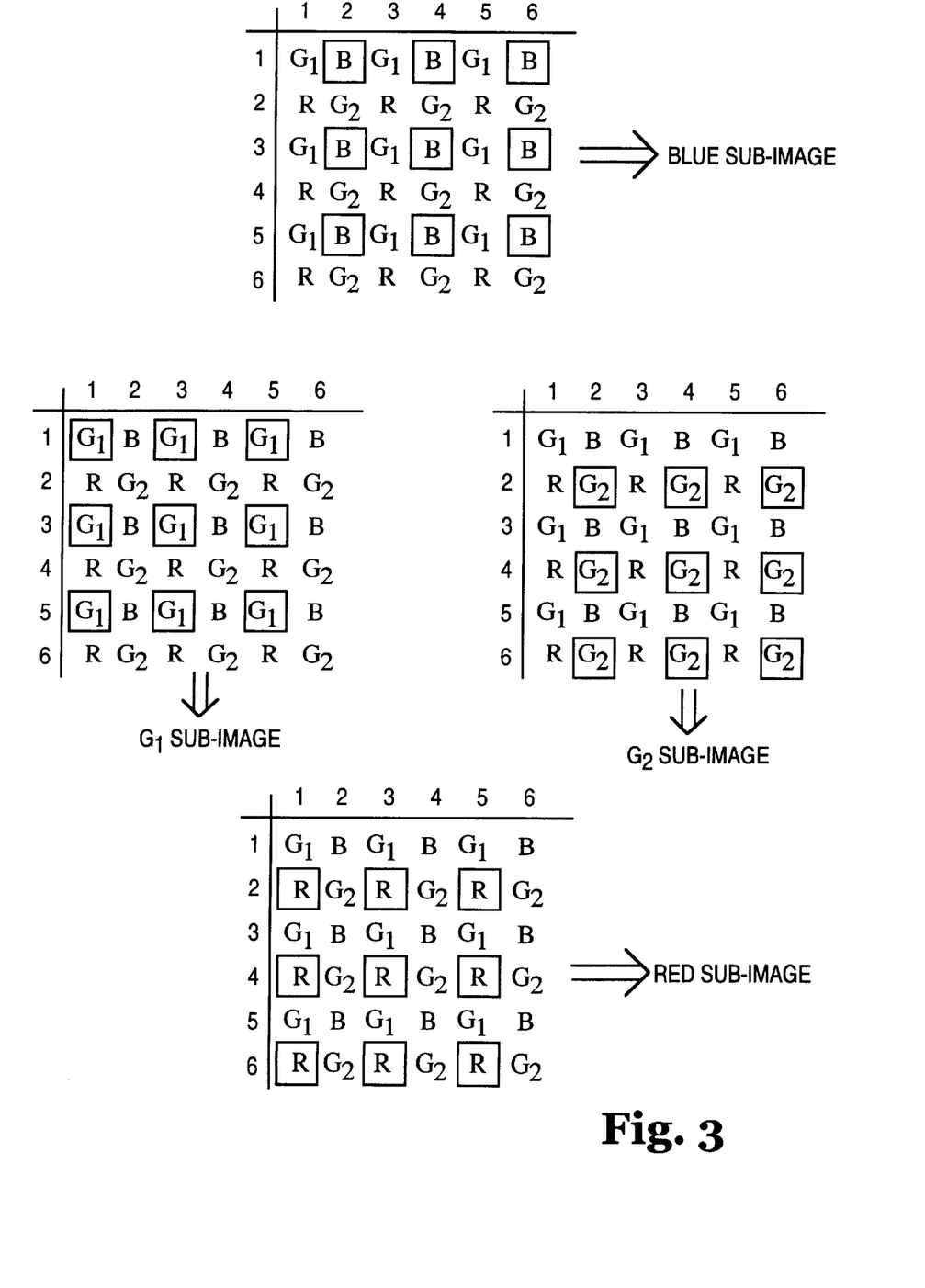
FIG. 3 illustrates the application of he noise removal technique independently in each color plane according to one embodiment of the invention.

FIG. 3 illustrates the application of the noise removal techniques to each color plane independently.

Since the noise removal technique presented in various embodiments of the invention operate directly upon the CFA version of the captured image which is essentially the raw captured image, it may be desired in one embodiment that the color planes may be separately considered. Thus, considering the 6 by 6 pixel Bayer pattern region of the image, the Blue (designated by "B" in FIG. 3) color plane (i.e., pixels associated with the color blue) may be separated out from the CFA and have the noise removal technique described above applied to it separate of color planes. Thus, the pixels associated with the blue plane at locations (2,1), (4,1), x(6,1), (2,3), (4,3), (6,3) and (2,5), (4,5), (6,5) can be arranged so that they are each adjacent one another. Likewise, other neighboring pixels in the Blue plane (not shown) of the CFA may be combined with the nine pixels illustrated to form a Blue sub-image. The noise removal framework described in the various embodiments of the invention may then be applied to this Blue sub-image directly and independently or other color planes.

In the Bayer pattern, Green pixels have roughly twice the representation of either Blue or Red pixels in the CFA. Often, it is useful to split the green pixels into those that accompany a row of alternating Blue pixels (a first Green labeled G1) and those that accompany a row of alternating Red pixels (a second Green labeled G2). Thus two Green color planes, G1 and G2 may be extracted from the CFA. This is useful since the number of computations for each color plane will then be identical. If G1 and G2 planes were considered together when applying the noise removal technique thereon, there would need to be a row and column offset to combine the G1 and G2 pixels (since they are on different rows and columns), and further the combined sub-image of a unified G1 and G2 would be twice as large in pixel count as the Blue and Red sub-images, leading to the need for a different, larger sized memory. For the purposes of analyzing the image, it is useful to consider the two Green color planes separately since the Green is vital in determining the chrominance (color content) present in neighboring pixels. This fact can be of use in techniques such as color interpolation or color resolution companding. To preserve the chrominance information in a more effective way for later use, therefore, it I desirable to consider the G1 and G2 color planes separately for the purpose of noise removal. If the noise is removed from the G1 and G2 sub-images independently rather than together according to the various embodiment of the invention, then the noise removal will more accurately reflect the relationship of details to their original color. The edge features have direction, and a combining of G1 and G2 pixels, which always lie at a 45 degree offset from one another, would introduce a 45 degree shift in the orientation of the edge.

Figure 4:
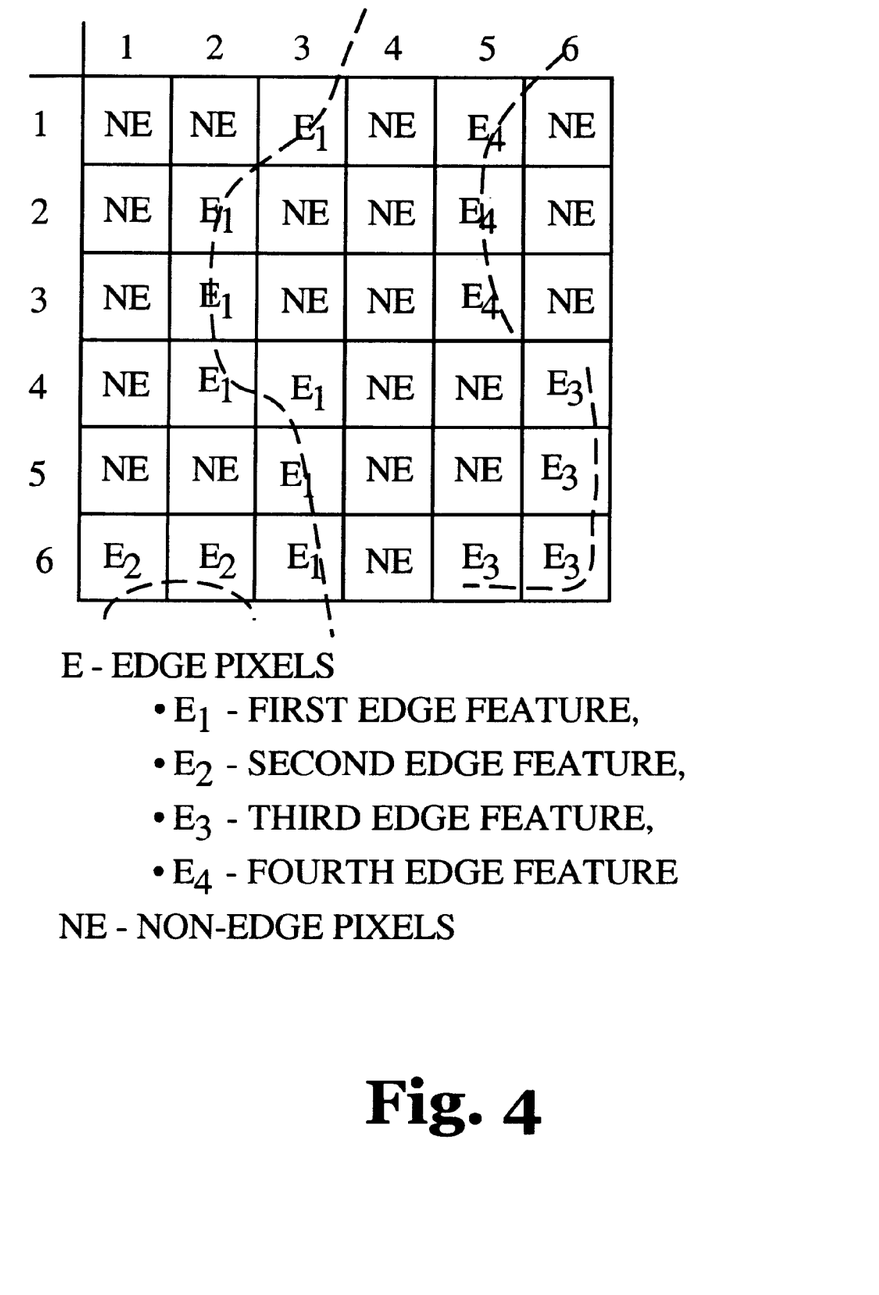
FIG. 4 illustrates the principles of at least one embodiment of the invention as applied to an exemplary image region.

FIG. 4 illustrates the principles of at least one embodiment of the invention as applied to an exemplary image region.

FIG. 4 shows a 6 by 6 pixel region of a captured image. A pixel x at a row location "i" and column location "j" will be represented hereafter as x(i,j). The exemplary image region shows both pixels that have already been classified as edge pixels (designated by an "E") and non-edge pixels (designated by an "NE"). The edge pixels are further designated by subscripts indicating which edge feature the edge pixel belongs to. For instance, a first darker edge feature (designated by $E_1$) may have intensity values in the neighborhood of 200, while a second lighter edge feature (designated by $E_2$) may have intensity values in the neighborhood of 50. Each of pixels $E_1$ and $E_2$ belong to two different edges of the image. The non-edge pixels have not been sub-classified into feature, and the classification of edge feature for edge pixels shown in FIG. 4 is merely to aid explanation and is not a limitation or requirement of the invention in any embodiment.

According to one embodiment of the invention, the edge pixels and non-edge pixels within an image are subjected to different noise removal techniques. In one embodiment, pixels that are not classified as belonging to an edge (NE in FIG. 4) are applied upon by a first noise removal technique. In one embodiment of the invention, this first noise removal technique is multi-level median hybrid filtering. The operation of such filtering is detailed below with respect to FIG. 5. All pixels classified as edge pixels are subjected to a second noise removal technique different from the first and having better edge preservation/enhancement characteristics than the first technique. In one embodiment of the invention, this second technique, applied to non-edge pixels, is a linear averaging of adjacent pixels having similar intensity values as the pixel under consideration.

For instance, referring to FIG. 4, the pixel NE(3,3) (non-edge pixel at row 3, column 3) would be treated with the median hybrid filtering technique, and is described in detail below with respect to FIG. 5. The output NE'(3,3) of the median filtering process would become the new noise removed pixel at location (3,3). The median filtering process would utilize all the pixels, whether they are classified as non-edge pixels or edge pixels, within the neighborhood (from pixel location (1,1) to (5,5) about the pixel NE(3,3) when performing its noise removal process.

By contrast, the edge pixel $E_1(3,2)$ would be applied upon by a linear averaging of only other edge pixels of similar intensity (edge pixels belonging to the same edge feature) to remove the noise present in $E_1(3,2)$. Of the eight pixels adjacent to $E_1(3,2)$, only three classify as belonging to the first edge feature, namely, pixels $E_1(2,2)$, $E_1(4,2)$ and $E_1(4,3)$. Thus, the linear averaging noise removal technique would average together four pixels (three adjacent and the edge pixel being removed of noise)—$E_1(3,2)$, $E_1(2,2)$, $E_1(4,2)$, and $E_1(4,3)$. Referring to the second feature, it should be noted that the pixel $E_2(6,2)$ has three adjacent edge pixels, but only one edge pixel $E_2(6,1)$ that belongs to the same edge feature (i.e., has a similar intensity value). The other two edge pixels $E_1(5,3)$ and $E_1(6,3)$ that are adjacent pixel $E_2(6,2)$ belong to a first edge feature, and thus should not be averaged with the pixels of the second edge feature. Otherwise the second edge feature would be decimated with its intensity value contaminated by a non-relevant and dissimilar intensity value or values. The methodology shown in FIG. 6 and detailed in the associated description below circumvents this situation by discerning edge pixels of similar intensity from other edge pixels. FIG. 4 shows a third edge feature (having pixels designated $E_3$) and fourth edge feature (having pixels designated $E_4$) which should be as carefully treated to avoid contamination from dissimilar edge pixels.

FIG. 4 shows only a portion of the image, but with regard to pixels lying on the physical edges of the image (first column, first row, last column, last row, etc.) these may simply not be processed for noise removal since a portion of the mask(s) will have no values, and thus, ineligible gradient information would be attained thereby. Alternatively, it may be desirable to use the dark current or reference pixels (of which there are usually several rows and columns) to substitute for missing values for edge pixels. These dark current pixels are not considered part of the final image CFA generated by the imaging device but are nonetheless captured by the sensing device to aid in determining pixel values.

Figure 5:
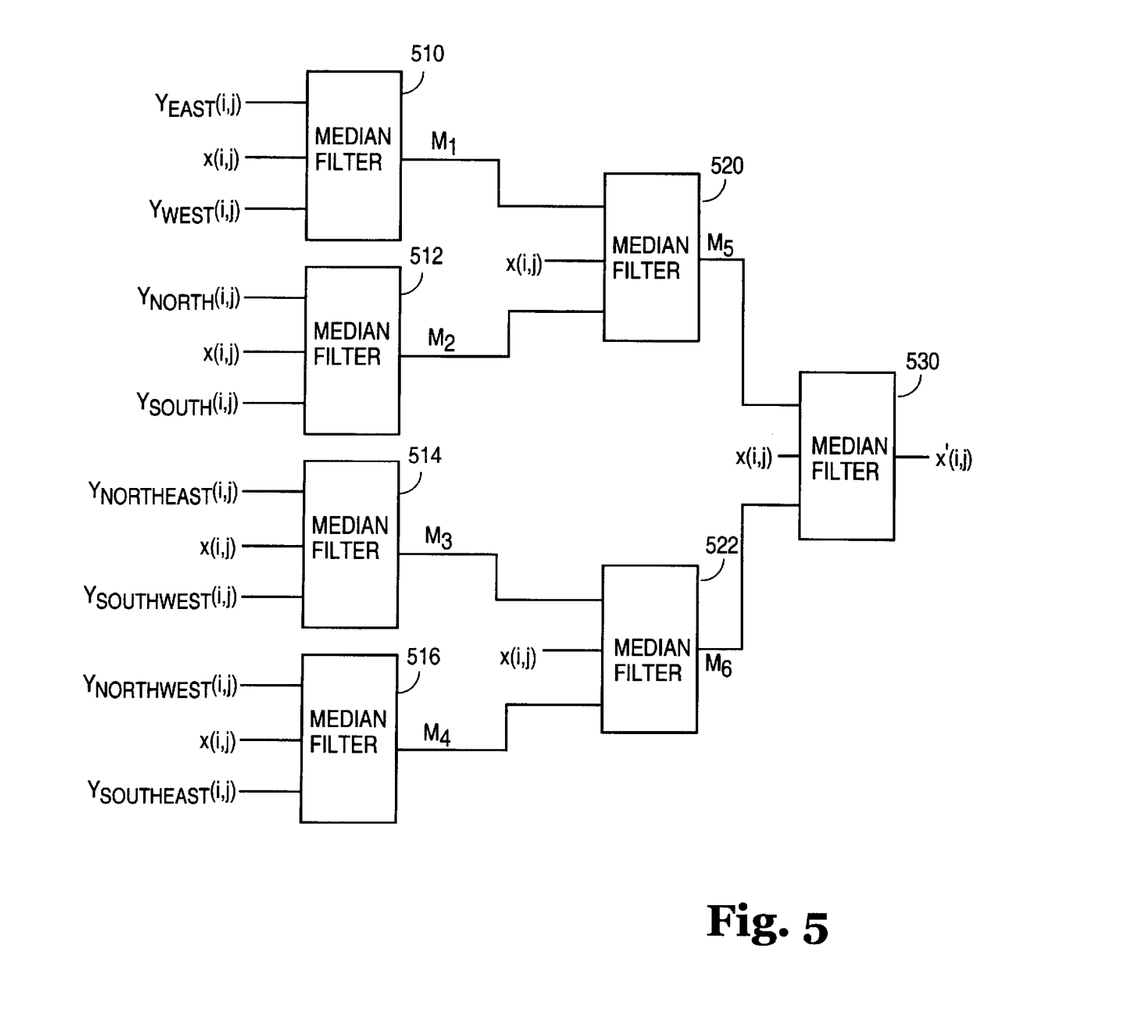
FIG. 5 is a block diagram of a three-level median hybrid filter as employed in the various embodiments of the invention.

FIG. 5 is a block diagram of a three-level median hybrid filter as employed in the various embodiments of the invention.

According to one embodiment of the invention, a pixel x(i,j) if classified as a non-edge pixel is applied upon by a noise removal technique that utilizes a multi-level median hybrid filtering process. A three-level median hybrid filter is designed for a K by K block about an input pixel x(i,j) that uses linear averaging subfolders to obtain the various values of the set for which the median is determined at the first stage or level of the filter shown in FIG. 5. Thus, if K=5, a 5 by 5 neighborhood about and including the pixel x(i,j) is considered for median hybrid filtering. According to one embodiment of the invention, the median hybrid filter of FIG. 5 would be applied to the pixel x(i,j) only if the pixel x(i,j) could be classified as an non-edge pixel, according to gradient or information. Otherwise, if pixel x(i,j) were a edge pixel, the nearest neighboring pixel averaging method discussed below with respect to FIG. 6 would be applied.

The averaging subfilters (not pictured) simply take the average of a number of neighboring pixels as desired by the size of the neighborhood. The averaging subfilters are applied to a vector of pixels in each of the eight directions (north, south, east, west, northeast, southeast, southwest and northwest). Hence, the averaging subfilters would produce the following output values $Y_{DIRECTION}(i,j)$ as follows:

$Y_{EAST}(i,j)=(x(i,j+1)+x(i,j+2))/2;$
$Y_{WEST}(i,j)=(x(i,j-1)+x(i,j-2))/2;$
$Y_{SOUTH}(i,j)=(x(i+1,j)+x(i+2,j))/2;$
$Y_{NORTH}(i,j)=(x(i-1,j)+x(i-2,j))/2;$
$Y_{SOUTHEAST}(i,j)=(x(i+1,j+1)+x(i+2,j+2))/2;$
$Y_{SOUTHWEST}(i,j)=(x(i+1,j-1)+x(i+2,j-2))/2;$
$Y_{NORTHEAST}(i,j)=(x(i-1,j+1)+x(i-2,j+2))/2;$ and
$Y_{NORTHWEST}(i,j)=(x(i-1,j-1)+x(i-2,j-2))/2;$ These output values are then fed into the median filters along with the center pixel value x(i,j) variously as shown in FIG. 5. By using an averaging sub-filter, the median operation is reduced to a sort of only three values at each stage of the median hybrid filtering process.

FIG. 5 shows that the first level of the three-level median hybrid filter has a set of median filters 510, 512, 514 and 516. Median filter 510 has an output M1 that is the median of three values, namely, $Y_{EAST}(i,j)$, $Y_{WEST}(i,j)$ and x(i,j). Median filter 512 has an output M2 that is the median of three values, namely, $Y_{NORTH}(i,j)$, $Y_{SOUTH}(i,j)$ and x(i,j). Median filter 514 has an output M3 that is the median of three values, namely, $Y_{NORTHEAST}(i,j)$, $Y_{SOUTHWEST}(i,j)$ and x(i,j). Finally, median filter 514 has an output M4 that is the median of three values, namely, $Y_{NORTHWEST}(i,j)$, $Y_{SOUTHEAST}(i,j)$ and x(i,j).

At the next or second level, there are a set of two median filters 520 and 522 which take as input, the median filter outputs M1, M2, M3 and M4 and the original pixel value x(i,j). Median filter 520 provides an output M5 that is the median of M1, M2 and x(i,j). Likewise, median filter 522 provides an output M6 that is the median of M3, M4 and x(i,j).

At the final or third level, a single median filter 530 provides the output pixel x'(i,j) that is the median of the outputs of the median filters from the second level, M5 and M6, when combined with the original pixel x(i,j). Thus, the noise removed pixel x'(i,j) is equal to the median of M5, M6 and x(i,j). The noise removed pixel will, in one alternate embodiment, be stored in a separate array to not interfere with the remainder of the noise removal process for other pixels. In this manner, the original pixel space is maintained so that the noise removal process may be iterated and adjusted to provide better results. In another alternative, the noise removed pixel will replace the original pixel immediately so that the noise removal process is recursive. This has the advantage of speed over an iterative method but also introduces uncertainty as a misclassified pixel will tend to propagate its mischaracterization to affect other pixels. Thus, the on-the-fly compute and replace method is not guaranteed to provide good results, though in some cases it may improve the noise removal.

Referring back to the example of FIG. 4, the non-edge pixel NE(3,3) would, according to one embodiment of the invention, be subjected the three-level median hybrid filter. As such, $Y_{EAST}(3,3)=(NE(3,1)+E_1(3,2))/2$ and $Y_{WEST}(3,3)=(NE(3,4)+E_4(3,5))/2$. Likewise, the other averaging subfilters can be applied about the location (3,3) to obtain the various subfilter outputs. The results are then fed into the median filters in the various levels along with NE(3,3) at each filter in each of those levels. The resultant intensity value NE'(3,3) becomes the noise-removed version of the original captured/decimated pixel NE(3,3).

The three-level median hybrid filter will essentially closely preserve the original non-edge pixel value because the median at each stage or level of the filtering process re-introduces the original pixel x(i,j) as one input at each of the median filters. Though the three-level median hybrid filter has been shown to work well with most images, applying it universally to all pixels of an image is disadvantageous. The orientation of the edge may not be discovered, as mentioned above, and further depending upon the signal-to-noise ratio of the image, a noisy edge pixel may be passed through the median filter unabated.

Figure 6:
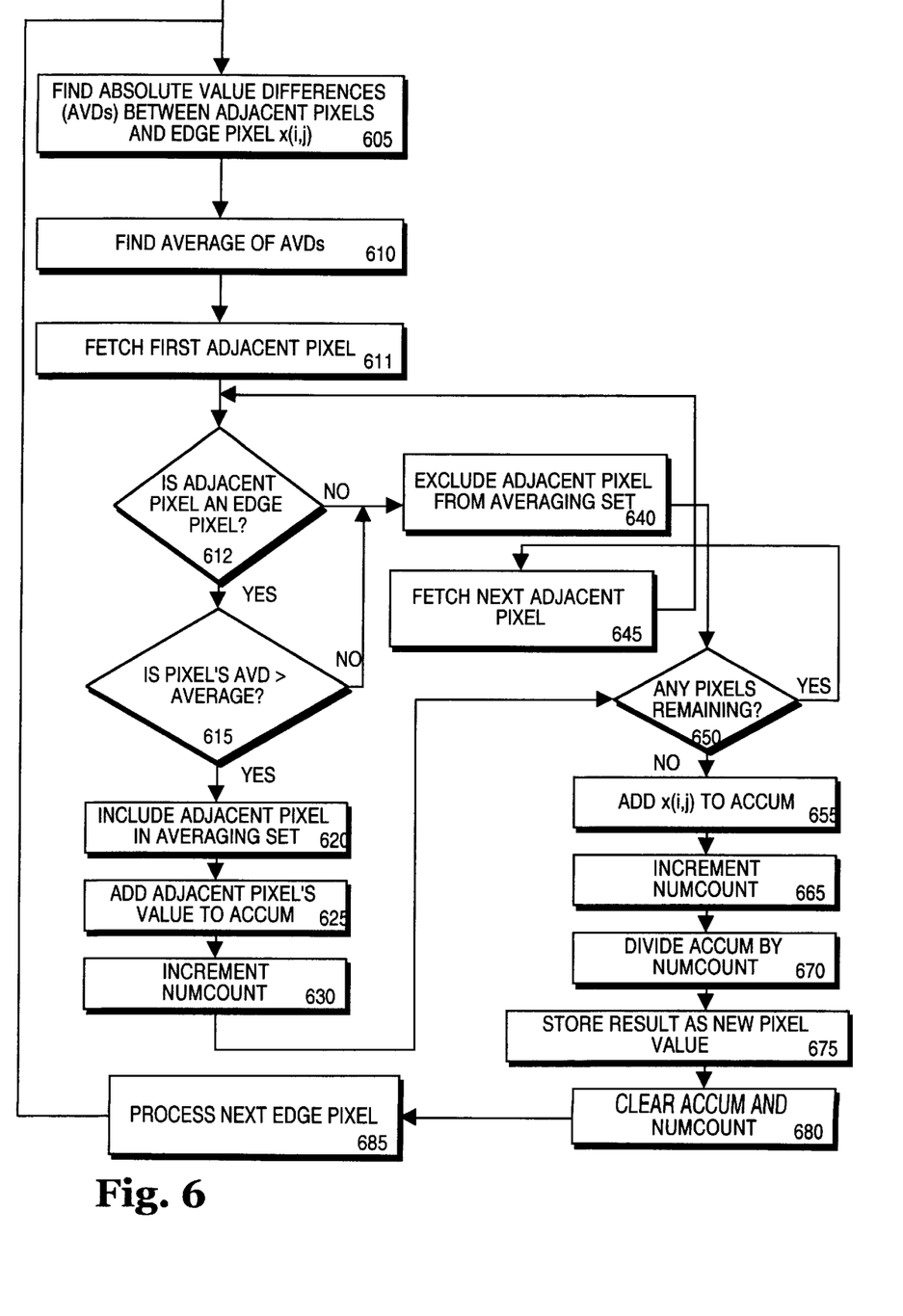
FIG. 6 is a block diagram of a three-level median hybrid filter as employed in the various embodiments of the invention.

FIG. 6 is a flow diagram illustrating nearest neighbor averaging for edge pixels according to one embodiment of the invention.

In one embodiment of the invention, an edge pixel is treated to a different noise removal technique than a non-edge pixel. Specifically, an edge pixel needs to retain the values of neighboring pixels that are also edges. When two different edge features are adjacent and have pixels adjacent each other (for instance, FIG. 4 shows edge pixels $E_2(6,2)$ and $E_1(6,3)$ belonging to a second and first edge feature respectively), then it is necessary to discriminate between them so that the wrong intensity value is not averaged together with the pixel under consideration. Thus, it is desirable to average together neighboring (adjacent) pixels that are both edge pixels and have "similar" intensity values with the pixel considered for noise removal. Intensity values are determined to be similar to by comparing the absolute value difference between the pixel under consideration for noise removal and adjacent pixel with the average of all such absolute value differences between the pixel under consideration for noise removal. If the difference is less than the average, then the adjacent pixel is considered to be of "similar" intensity with the pixel under consideration for noise removal.

FIG. 6 illustrates a flow diagram to perform such nearest neighbor averaging of similar intensity pixels. First, according to step 605, the AVD (absolute value difference) or distance between the pixel x(i,j) and each adjacent pixel is determined. For instance, the north neighboring adjacent pixel x(i-1,j) has a distance $\Delta_{NORTH}=|x(i,j)-x(i-1,j)|$. Likewise, the AVDs of each adjacent pixel to the pixel x(i,j) is determined. The AVD is essentially a measure of correlation between the pixel under consideration for noise removal and the adjacent pixel which is being considered for inclusion into the averaging set (see step 620). Those adjacent pixels that are well correlated linearly with the pixel x(i,j) will be averaged together with the value x(i,j) to attain the noise removed output pixel x'(i,j). The AVDs thus, are:

$\Delta_{NORTH}=|x(i,j)-x(i-1,j)|$, $\Delta_{SOUTH}=|x(i,j)-x(i+1,j)|$
$\Delta_{WEST}=|x(i,j)-x(i,j-1)|$, $\Delta_{EAST}=|x(i,j)-x(i,j+1)|$
$\Delta_{NORTHEAST}=|x(i,j)-x(i-1,j-1)|$, $\Delta_{SOUTHWEST}=|x(i,j)-x(i+1,j+1)|$
$\Delta_{NORTHWEST}=|x(i,j)-x(i-1,j+1)|$, $\Delta_{SOUTHEAST}=|x(i,j)-x(i+1,j-1)|$.

Once all eight AVDs (one for each adjacent pixel in the eight cardinal directions) is determined, then the AVD average value is determined (step 610). The AVD average value is simply the sum of the individual AVDs divided by eight.

Once the AVD average value is determined, the next step is check whether a first adjacent pixel is an edge pixel or not (step 612). If the pixel is not an edge pixel, then it cannot be suited for the averaging method and is excluded from the pixel averaging set (step 640). If the adjacent pixel is an edge pixel, then another comparison for relative correlation is performed to check whether the adjacent pixel belongs to the same edged feature as the pixel under consideration, or belongs to different edge feature (see FIG. 4, showing pixels $E_1$, $E_2$, $E_3$ and $E_4$ belonging to four different edge features of varying intensity. The test for correlation (step 615) is performed upon discovering that the adjacent pixel is an edge pixel. According to step 615, the adjacent pixel's AVD is compared against the average AVD value determined at step 610. If the adjacent pixel is not correlated, i.e., its value is not less than the average AVD, then the pixel is excluded from the averaging set (step 640).

If the adjacent pixel is an edge pixel and its AVD is less than the average AVD, then the pixel is included into the averaging set which is utilized for the noise removal technique (step 620). As part of the averaging set, the first step is to add the intensity value of that adjacent pixel to a variable (register) ACCUM which essentially keeps a running sum of each averaging set pixel (step 625). The ACCUM variable or register will facilitate the averaging determination (performed at step 670). Since it is unknown at the beginning of the noise removal by averaging technique for edge pixels how many adjacent pixels are within the averaging set, a second variable (register in hardware) NUMCOUNT is used to track the number of pixels within the averaging set. Every time a new adjacent pixel is included in the averaging set, NUMCOUNT is incremented by one, starting at an initial value of zero.

If any other adjacent pixels are remaining to be considered for averaging, then the next adjacent pixel is fetched (step 645) and the steps 612 through 650 repeat. When a pixel is excluded from the averaging set, the same check for other remaining pixels (step 650) is performed. When there are no more adjacent pixels left to be considered for the averaging set,, then finally, the value of the pixel x(i,j) under consideration for noise removal is added to ACCUM (step 655). This facilitates the averaging in of the original pixel value with the averaging set so that the original pixel value has equal representation therein. In addition, NUMCOUNT is incremented by one (step 665) so as to account for the extra pixel x(i,j) included in the averaging set. According to step 670, the average of the pixels in the averaging set is determined by dividing the contents of ACCUM by NUMCOUNT. The resultant average is the noise removed pixel x'(i,j). This value x'(i,j) is stored into an array or table so that the original value x(i,j) is not overwritten and can be used in further noise removal computation for other pixels (step 675). When the noise removed pixel value x'(i,j) is determined, the variables (registers) ACCUM and NUMCOUNT are cleared (set to zero to facilitate the processing of the next edge pixel x. When the noise is thus removed from the edge pixel x, another pixel classified as an edge pixel may be fetched (step 685) and the steps 605–680 repeated for that new pixel.

By averaging together adjacent edge pixels of similar intensity with the original pixel x(i,j), the edge feature is maintained and may even be enhanced due to the smoothing and uniformity across the edge as a result of averaging. Treating the edge pixels differently from non-edge pixels avoids the traditional problems of noise removal edge decimation and bleeding in color after interpolation is performed. The averaging technique may also be implemented in a fast hardware architecture as desired in portable digital camera, and can apply directly to the CFA domain (Bayer pattern RGB color space prior to color interpolation).

Figure 7:
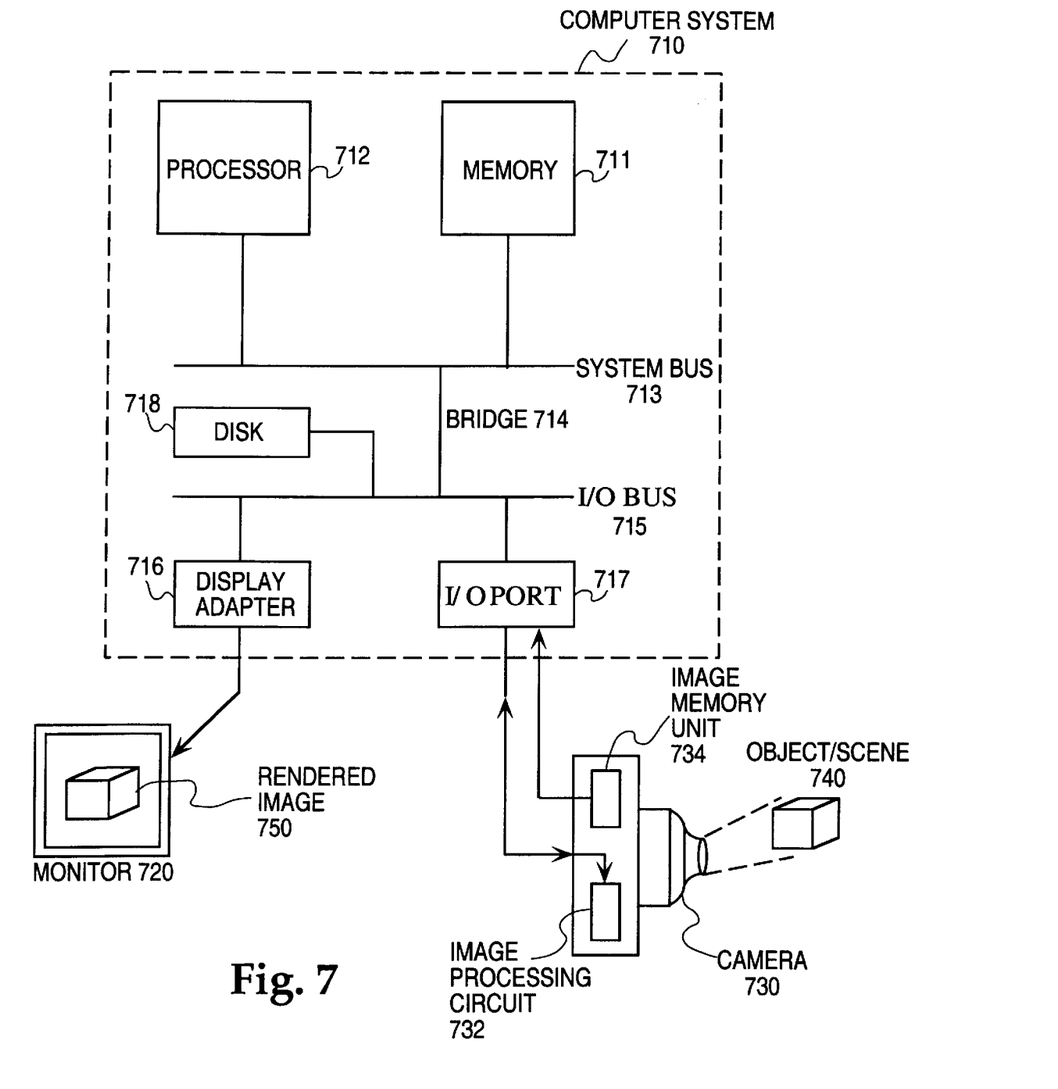
FIG. 7 is a system diagram of one embodiment of the invention.

FIG. 7 is a system diagram of one embodiment of the invention.

FIG. 7 illustrates a computer system 710, which may be any general or special purpose determining or data processing machine such as a PC (personal computer), coupled to a camera 730. Camera 730 may be a digital camera, digital video camera, or any image capture device or imaging system, and is utilized to capture a sensor image of an object or scene 740. Essentially, captured images are compressed and processed by an image processing circuit 732 so that they can be efficiently stored in an image memory unit 734, which may be a RAM or other storage device such as a fixed disk, miniature card, etc. In most digital cameras, raw images obtained from the image capture mechanism such as a sensor are stored first on camera 730 and downloaded later to be output, displayed, or manipulated. This allows the camera 730 to capture the next object quickly without additional delay. One convenient raw image representation is the 8-bit Bayer pattern CFA described above.

In one embodiment, an image is captured by camera 730 as a raw 8-bit Bayer pattern CFA and then compressed into some other data or encoded format. Noise removal according to one embodiment of the invention operates as follows. First, the compressed image is downloaded from camera 730 through I/O port 717 to a disk 718 or other device on the computer system 710. The compressed image is decompressed on computer system 710. Then, the computer system performs noise removal on the recovered CFA image prior to any color interpolation by executing instructions for doing so as described in the various embodiments of the invention.

The methodology described in the various embodiments of the invention may be executed using a processor 712 such as the Pentium™ (a product of Intel Corporation) and a memory 711, such as RAM, which is used to store/load instruction, addresses and result data. The application used to perform noise removal on the CFA image may be an executable module compiled from source written in a language such as C++. The instructions of that executable module, which correspond with instructions that aid in detecting edges and applying a first noise removal technique for edge pixels and a second noise removal technique for non-edge pixels may be stored to a disk 718 or memory 711, and thus may be loaded through some computer-readable medium. It would be readily apparent to one of ordinary skill in the art of computer sciences to program a determining machine to carry out the interpolation methodology described in various embodiments of the invention.

Computer system 710 has a system bus 713 which facilitates information transfer to/from the processor 712 and memory 711 and also has a bridge 714 which couples system bus 713 to an I/O bus 715. I/O bus 715 connects various I/O devices such as a display adapter 716, disk 718 and an I/O port, such as a serial port. Many such combinations of I/O devices, buses and bridges can be utilized with the invention and the combination shown is merely illustrative of one such possible combination.

When an image, such as an image of object/scene 740, is captured, the image is sensed as R, G, and B pixels, in a CFA such as the Bayer pattern. These pixel values are sent to the image processing circuit 732. Image processing circuit 732 consists of ICs and other components which execute among other functions, an image compression scheme to reduce the size of the transfer between camera 730 and computer system 710. The need for color interpolation is most significant when the image is to be displayed or output and thus does not have to be performed on camera 730. When the user or application desires/requests a download of images, the compressed images stored in the image memory unit are transferred from image memory unit 734 to the I/O Port 717. I/O port 717 uses the bus-bridge hierarchy shown (I/O bus 715 to bridge 714 to system bus 713) to temporarily store the image data into memory 711 or, optionally, to disk 718. The compressed images are decompressed by suitable application software (or dedicated hardware) and may utilize processor 712 for doing so. The decompressed image data will be recovered as a 8-bit Bayer pattern CFA similar or identical to the image data as captured by the sensor of camera 730.

The downloaded image once decompressed will thus have pixels in their raw CFA form. If a noise removed image is desired to be output on monitor 720, then noise removal according to the various embodiments of the invention should be employed prior to forming full color pixels through color interpolation should be employed. The downloaded and decompressed image is analyzed pixel-by-pixel and by applying the techniques discussed above, each pixel is transformed into a noise removed pixel. Preferably, each noise removed pixel is stored in memory 711 or disk 718 into an array so that the original (recovered) CFA is maintained for the noise removal of other pixels. Once the noise removal is performed throughout the CFA, then the noise removed array may be used in the color interpolation process, and if desired, the original (recovered) CFA discarded. Noise removed and then color interpolated rendered image 750 will be rendered with better detail, sharper edges and less noise, given adequate display devices (monitor 720 and adapter 716) and will thus, more closely resemble the original object/scene 740. The noise removed and color interpolated image may be stored onto disk 718, memory 711 and/or output directly to monitor 720 after being rendered through display adapter 716.

The computer program code for noise removal may be packaged onto a removable computer-readable medium such as floppy disk or CD-ROM and may accompany software that performs the decompression of images downloaded from camera 730. As with any other software, it can be downloaded/distributed over a network on communications system, or can be available in firmware. These downloaded images can be noise removed according to their edge features so that the images will more accurately visually present the object/scene 740 to the user. Noise removal according to another embodiment of the invention may also be implemented in hardware on the camera 730 itself.

In an alternative embodiment of the invention, the image processing circuit 732 can be adapted to include circuitry for performing noise removal on-camera, such that the stored image in image memory unit 734 is a noise removed image. Thus, when downloaded to a computer system 710 or a rendering device, a first level of noise will be already eliminated. In such an embodiment, the image may be noise removed at any stage in the image processing. For instance, the noise removal technique(s) of the various embodiments of the invention, which are applicable directly in the CFA domain, may be employed after or before color resolution companding. In such a hardware embodiment, where speed is desired, each noise removed pixel, as it is being determined, can be written back directly to the image memory unit 734 or other storage mechanism where the CFA is stored, so that the noise removal process is recursive. The methods described above for finding pixel gradients and determining edges are easily implemented in VLSI (Very Large Scale Integration) or other integrated circuitry. The noise removal techniques presented in various embodiments of the invention have the advantage of potential direct hardware implementation since unlike traditional noise removal techniques, they are designed to apply directly to the CFA domain.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
    classifying single color pixels of a captured color image while in its Color Filter Array form as either edge pixels or non-edge pixels;
    applying a first noise removal technique to those pixels classified as non-edge pixels; and
    applying a second noise removal technique to those pixels classified as edge pixels, said noise removal techniques applied while said image is still in its Color Filter Array form, wherein classifying and applying are performed independently with respect to each color plane in said Color Filter Array such that said noise removal techniques are performed prior to color interpolation.

2. A method according to claim 1 wherein classifying includes:
    defining a localization region, said localization region including a portion of said captured image;
    determining the gradient of every pixel within the localization region; and
    for each pixel, comparing its gradient value to a given threshold value, if the gradient value is greater than said threshold value, classifying the pixel as an edge pixel, and if not, classifying the pixel as a non-edge pixel.

3. A method according claim 2 wherein said given threshold value is a localized threshold value determined by analyzing the gradient values for all pixels within the localization region.

4. A method according to claim 2 wherein the steps of defining determining and classifying are repeated until all pixels of said captured image are classified.

5. A method according to claim 1 wherein said first noise removal technique includes the application a multilevel median hybrid filter.

6. A method according to claim 1 wherein said second noise removal technique includes a linear averaging of adjacent pixels belonging to the same edge feature.

7. A method according to claim 2 wherein determining the gradient includes:
    applying a first mask to a neighborhood around each pixel whose gradient is being determined to attain a first direction differential quantity;
    applying a second mask to said neighborhood around each pixel whose gradient is being determined to attain a second direction differential quantity, said second direction, wherein said second direction is perpendicular to said first direction;
    determining the gradient to be the magnitude of a vector defined by vector addition of said first direction differential quantity and said second direction differential quantity.

8. A method according to claim 7 wherein said magnitude is obtained by:
    squaring said first direction differential;
    squaring said second direction differential;
    summing said squared first and second direction differentials; and
    extracting the square root of said sum, said magnitude set to equal said square root.

9. A method according to claim 7 wherein said first mask is a Sobel mask having coefficients of −1 and +1 in variously said first direction.

10. A method according to claim 7 wherein said first mask is a Sobel mask having coefficients of −1 and +1 variously in said second direction.

11. A method according to claim 7 wherein said first mask is a Prewitt mask having coefficients of −1, −2, +1 and +2 variously in said first direction.

12. A method according to claim 7 wherein said first mask is a Prewitt mask having coefficients of −1, −2, +1 and +2 variously in said second direction,
    wherein classifying and applying are performed independently with respect to each color plane in said CFA.

13. A method according to claim 1 wherein said CFA includes four color planes, namely, a Red color plane, a first Green color plane, a second Green color plane and a Blue color plane.

14. A method according to claim 1 wherein said CFA is arranged in a Bayer pattern.

15. A method according to claim 6 wherein one edge feature is distinguished from a another edge feature by applying the steps of:
    determining the absolute value difference (AVD) between the pixel under consideration for noise removal and each pixel adjacent to said pixel under consideration for noise removal;
    averaging together all of said AVDs;
    comparing said average of AVDs with the AVD for each adjacent pixel, if said AVD for a given adjacent pixel is less than said average of AVDs, then including that adjacent pixel as belonging to the edge feature of said pixel under consideration for noise removal.

16. A computer-readable medium having instructions stored thereon that when executed by a processor, cause said processor to perform:
    classifying single color pixels of a captured color image while in its color filter array form as either edge pixels or non-edge pixels;
    removing noise from a pixel classified as a non-edge pixel according to a first noise removal technique; and
    removing noise from a pixel classified as an edge pixel according to a second noise removal technique;
    wherein classification and noise removal are performed independently with respect to each color plane in said captured image such that said noise removal techniques are performed prior to color interpolation.

17. An imaging apparatus comprising:

an image processing unit to receive raw color image data, said image processing unit configured to classify single color pixels in said raw image data; remove noise from non-edge pixels according to a first noise removal technique and to remove noise from edge pixels according to a second noise removal technique; wherein classification and removal are performed independently with respect to each color plane in said raw image data such that said noise removal techniques are performed prior to color interpolation.

18. An apparatus according to claim 17 wherein said raw image data is stored in a Bayer pattern color filter array.

19. An apparatus according to claim 17 further comprising:

an image memory unit coupled to said image processing circuit to receive and store said raw image data as pixels already subjected to said noise removal techniques.

20. A system comprising:

an image capture device configured to provide raw color image data in the Color Filter Array domain; and a data processing unit coupled to said image capture device, said data processing unit configured to remove noise from said raw image data while still in the CFA domain, said data processing unit configured to classify single color pixels in said raw image data; apply a first noise removal technique to pixels in said raw image data classified as non-edge pixels; and to apply a second noise removal technique to pixels in said raw image data classified as edge pixels; wherein classification and removal are performed independently with respect to each color plane in said raw image data such that said noise removal techniques are performed prior to color interpolation.

21. A system according to claim 20 further comprising a storage medium coupled to said data processing unit, said storage medium storing said noise removed image data.

22. A system according to claim 20 further comprising a display device coupled to said data processing unit, said display device configured to render said noise removed raw image data together with interpolated color components to form a full color image upon output from said display device.

* * * * *